July 20, 1943.  H. J. McCREARY  2,324,634
ELECTROMAGNETIC INDUCTANCE APPARATUS
Filed Dec. 31, 1940   2 Sheets-Sheet 1
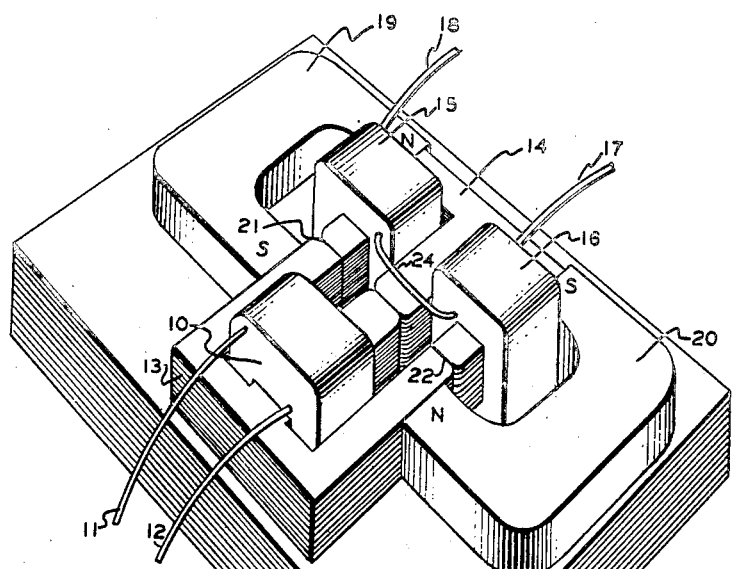
FIG.3.
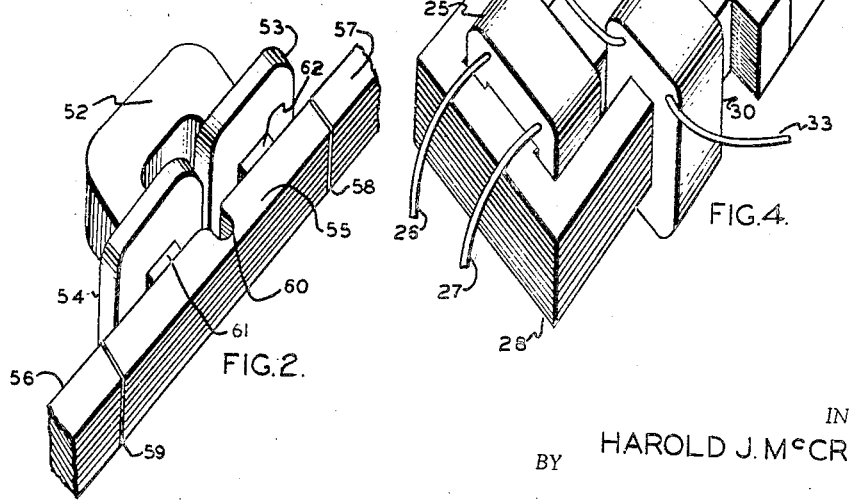
FIG.1.
FIG.2.
FIG.4.
INVENTOR.
HAROLD J. McCREARY.
BY
ATTORNEY.

July 20, 1943.   H. J. McCREARY   2,324,634
ELECTROMAGNETIC INDUCTANCE APPARATUS
Filed Dec. 31, 1940   2 Sheets-Sheet 2
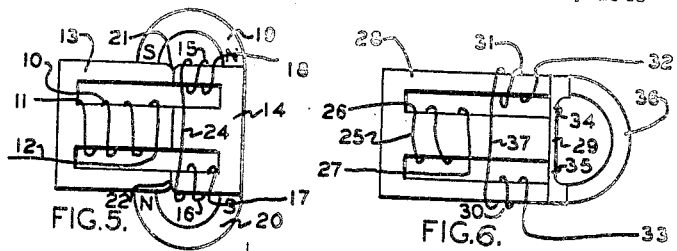
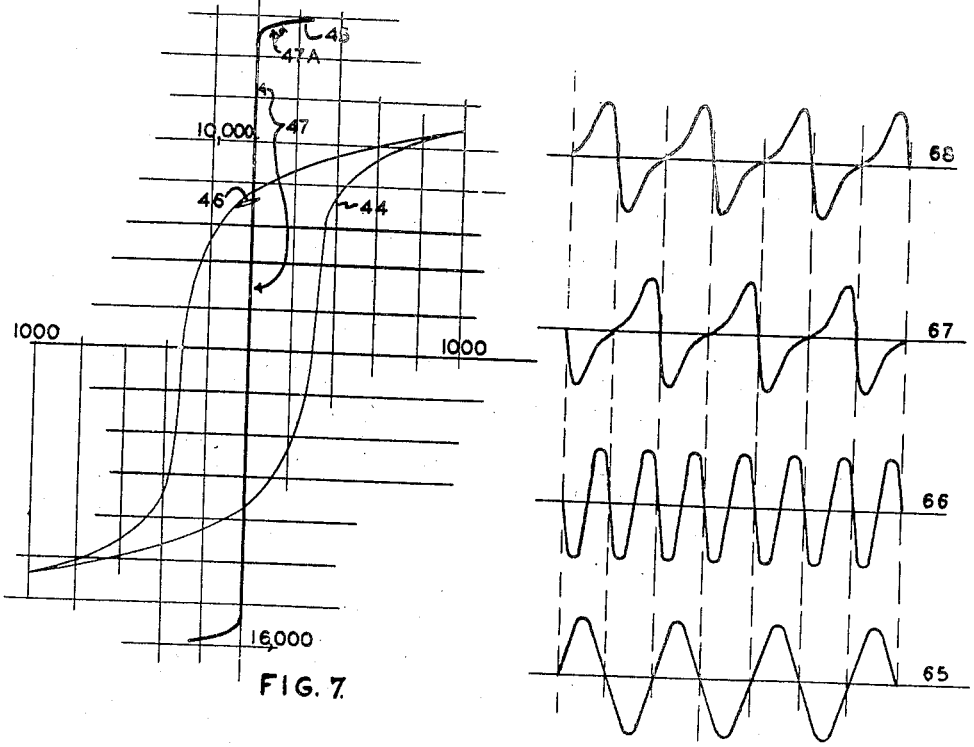
FIG. 8.
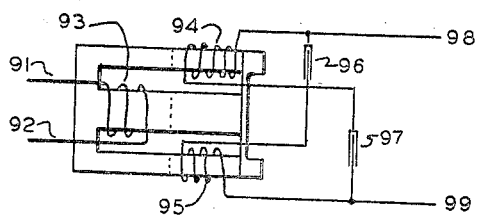
FIG. 6A.
*INVENTOR.*
HAROLD J. McCREARY.
BY
ATTORNEY.

Patented July 20, 1943

2,324,634

UNITED STATES PATENT OFFICE 2,324,634

ELECTROMAGNETIC INDUCTANCE APPARATUS

Harold J. McCreary, Lombard, Ill.

Application December 31, 1940, Serial No. 372,484

12 Claims. (Cl. 172—281)

This invention relates in general to electromagnetic induction apparatus and more specifically to the introduction of permanent magneto motive forces into their fixed magnetic circuits.

The primary object of this invention is the introduction of fixed magneto motive forces into the magnetic circuits of alternating current apparatus by means of permanent magnets or the like to cause magnetic saturation of a number of an alternating current magnetic circuit.

One feature of this invention is the introduction of magnetically saturated relatively short areas in a magnetic circuit of an alternating current device and the utilization of this for distortion of voltages generated by the alternating magnetic flux in the circuit so that it in effect has a certain valve action.

Another feature of this invention is the use of the extremely high coercive force materials to prevent alternating current fields from flowing through the permanent magnet to the extent of damaging the permanent magnet.

Another feature of this invention is the use of air gaps in connection with the elements magnetized by the permanent magnet to isolate the permanent magnetic flux from as much as possible of the alternating magnetic circuit.

Another feature of this invention is the simultaneous conduction or super-imposition of permanent magnet flux and alternating current flux through a common constricted magnetic circuit element, the permanent magnet flux and alternating current flux proceeding substantially independently in their respective magnetic circuits with the exception of the common linkage.

Another feature of this invention is the isolation and control of the fixed flux and alternating current flux to their respective areas by the use of copper slugs producing high eddy currents, and permanent magnet material of high coercive force and hysteresis loss, also in the use of full and partial magnetic air gaps to control the proper combination and mixture of the fluxes and their subsequent separation.

The importance of a fixed magnetomotive force in an alternating current magnetic circuit has long been appreciated. However, the fixed magnetic fluxes have in the past been produced by direct currents, having a bad effect in the case of some radio choke coils and transformers but some good effects as in the case of frequency doubling devices. Reference may be had to "Theory and Calculation of Magnetic Circuits," by C. P. Steinmetz 1917, page 157, paragraph 79, where he tells of the use of direct current magnetic fields super-posed over alternating current fields to double the frequency.

Features and objects of my invention will be more apparent from my specification and claims.

That the invention may be better understood reference is had to the accompanying drawings and the following description of some of the preferred embodiments thereof. It is to be understood that the preferred embodiments disclosed are for illustrative purposes only, and are not to be construed as limiting the scope of protection sought.

Referring now to the accompanying drawings.

Fig. 1 is a diagrammatic illustration of a portion of a magnetic circuit forming a magnetic valve in which a permanent magnet causes magnetic saturation across a restricted portion formed by the points of contact of a butt joint of an alternating magnetic circuit.

Fig. 2 is a diagrammatic illustration of a slightly different magnetic circuit having the magnetic valve action in which a permanent magnet causes magnetic saturation across a restricted portion of an alternating magnetic circuit, with the addition of means for further controlling the magnetic fluxes.

Fig. 3 is a drawing of an alternating current frequency doubler using the magnetic valve effect caused by the magnetic saturation by two permanent magnets.

Fig. 4 is a drawing of an alternating current frequency doubler, using the magnetic valve effect caused by the magnetic saturation by one permanent magnet in two alternating current magnetic circuits.

Fig. 5 is a diagrammatic illustration of electrical connections of the device shown in Fig. 3.

Fig. 6 is a diagrammatic illustration of electrical connections of the device shown in Fig. 4.

Fig. 6A is a modified form of the circuit shown in Fig. 6.

Fig. 7 is the hysteresis curve of a material used in alternating magnetic fields and to the same scale that of a permanent magnet material (40% cobalt).

Fig. 8 shows the curves of input voltage and output voltages as actually recorded on an oscillograph from the frequency doubler of Fig. 3 which curves are similar to those of Fig. 4.

In the forms chosen for disclosure of my invention illustrated in Figs. 1 to 8, the basic principles and method of applying my discovery and invention are illustrated. It is of course apparent that these principles and fundamentals can be used in applying this invention to any number of alternating magnetic flux devices in which a magnetic valve effect as described is of value.

Fig. 1 illustrates a portion of a magnetic circuit in which a permanent magnet has been associated with a restricted portion of the magnetic circuit to cause magnetic saturation of that portion and therefore to introduce a locally energized magnetic circuit which is saturated by a fixed magnetic flux. As illustrated the laminations 49 and 50 of any well known nickel iron high permeability low loss alloy, which form a portion of a greater magnetic circuit (not shown), are joined by a butt joint at point 51. The laminations are also reduced in width at one side of the joint to thus form a restricted point in the magnetic circuit, through which the flux of a permanent magnet 48 passes, to thus insure saturation at the point 51. The magnet 48 is preferably constructed of the material known as "Alnico" which has a high coercive force thus tending to prevent alternating magnetic flux in the circuit 50, 51 from passing through the magnet. The laminations 49 and 50 being of magnetic steel, the alternating flux passes primarily through the joint 51 at which point it is subjected to the magnetic valve action due to the saturation of that joint.

Fig. 2 illustrates a portion of a slightly modified form of a magnetic circuit in which a restricted portion is provided at point 60 by the reduction in width shown and a permanent magnet 52 of "Alnico" has its poles bridging the point 60. A pair of small air gaps 58 and 59 which tend to restrict the fixed magnetic flux of the permanent magnet 52 to the area between said gaps and prevent its passage through the rest of the alternating flux circuit including parts 56 and 57. In addition the permanent magnet 52 is provided, on each of its legs, with heavy washers of copper or like material which encircle each pole of the magnet and tend to exclude from the permanent magnet any alternating magnetic flux flowing in the circuit including laminations 56, 55 and 57. The reduced portion 60 in the local magnetic circuit of magnet 52 tends to insure saturation of the magnetic circuit at that point to provide a valve action for the alternating flux at that point.

Referring now to Fig. 3, I have shown a frequency doubler of new and novel design incorporating my invention and discovery. It consists of an alternating current magneto motive force coil 10. In one model built, this was a coil of 1600 turns of #31 enameled copper wire on a ⅝"x⅝" core and the coil was ¾" long. 11 and 12 are leads to the coil and in this specific model were connected to 110 volts, 60 cycles alternating current. The coil 10 it will be observed rests on the center leg of a stack 13 of silicon steel E laminations (this could also be any of the well-known nickel iron high permeability low loss alloys). Butted against the stack of open E laminations as shown is an inverted E stack 14 of silicon steel laminations etc. as shown. On the outer legs of the inverted E stack of silicon steel laminations 14 are the coils 15 and 16 and they are connected in series bucking by lead 24 so that the alternating current magneto motive force produced by coil 10 will not induce a potential between leads 17 and 18 with the elements as thus far described assembled, that is without magnets 19 and 20. In the specific embodiment of my invention the coils 15 and 16 are each of 2000 turns of #32 enameled copper and their cores are ⅝"x11/32" and ¾" long.

When the permanent magnets 19 and 20 are added as shown producing a magnetic saturation at the butt joints of contact 21 and 22 which are of restricted area and with magnetic poles as shown it is found that an alternating current of double the frequency is produced from wires 17 and 18 (see 66 of Fig. 10). The permanent magnets as shown and used in this specific model are of Alnico and have pole faces ¾"x¾" square. The apparatus as described is clamped to a nonmagnetic base 23 by means of brass screws and clamps (not shown).

Fig. 4 shows somewhat more compact design of a frequency doubler incorporating the elements of my invention and discovery. The coil 25 corresponds to and is identical in dimensions to coil 10 of Fig. 1. 26 and 27 are leads to an alternating current power supply. 28 is a stack of silicon steel etc. laminations identical in dimensions to 13 in Fig. 1. However 29 is a stack of I laminations of a special shape and design as shown. Coils 30 and 31 correspond to and are identical in dimensions to coils 15 and 16 of Fig. 1 with lead out wires 32 and 33 to supply the doubled frequency and they are interconnected by lead wire 37. 36 is a permanent magnet of Alnico substantially like 19 or 20 of Fig. 1 and produces magnetic saturation in the restricted portions 34 and 35 of the stack of I laminations. These two restricted portions again distort the flux produced by coil 25 so as to induce in the output circuit of coils 30 and 31 a current having a frequency double that of the input current in coil 25.

Fig. 5 is a schematic diagram of Fig. 3 and shows actual electrical connections.

Fig. 6 is a schematic diagram of Fig. 4 and shows actual electrical connections.

In Fig. 7 44 is a hysteresis curve for 40% cobalt magnet steel and on the same scale is shown a hysteresis curve 45 for Allegheny electric metal. It will be noted that curve 45 has practically zero area when compared to curve 44. However in all the embodiments of my invention it will be noted that alternating magneto motive forces of very small values are used in the permanent magnet materials so that the permanent magnet materials are operated over very small loops such as 46 of Fig. 9 in all cases and the losses are therefore small.

In Fig. 8 are shown copies of actual oscillographs of the results obtained in operation of my invention as shown in Fig. 1. 65 is a sine wave of voltage at 60 cycles 110 volts impressed on coil 10 by means of leads 11 and 12. 66 is a sine wave of 120 cycles which appears across output wires 17 and 18. 67 is the voltage wave which appears across terminals 17 and 24 while 68 is the voltage which appears across 24 and 18. The wave 67 added to the wave 68 gives the wave 66.

Referring to Fig. 6A.

This is an arrangement whereby the internal impedance of the output circuit of Fig. 5 or 6 can be substantially reduced and thereby decrease the regulation. The permanent magnets were left out as the circuit applies to either Fig. 3 or Fig. 4. The output windings are substantially in parallel. The series condensers serve to smooth out the wave and emphasize the doubled frequency. It may be noted however that this circuit arrangement works without the condensers.

In Fig. 6A, 91 and 92 are input terminals for coil 93 corresponding to 11 and 12 for coil 10 of Fig. 1 or 26 and 27 for coil 25 of Fig. 2. While coils 94 and 95 of Fig. 7A correspond to coils 15 and 16 of Fig. 1 and coils 30 and 31 of Fig. 2, they are here connected in parallel aiding of the doubled frequency, which means they are in parallel bucking of the base frequency. Therefore by placing the condensers 96 and 97 in series with each coil as shown before parallelling, the doubled frequency can be greatly accentuated and the bucking of the base frequency minimized. 98 and 99 are output lead wires corresponding to wires 17 and 18 of Fig. 1 or 32 and 33 of Fig. 2.

What I claim is:

1. In an alternating current control apparatus, a core of magnetic material forming a magnetic circuit, means associated with said core for causing an alternating magnetic flux to flow in said circuit, means for producing a steady magnetic flux in only a restricted portion of said circuit to cause said portion to be magnetically saturated, said flux in said restricted portion of said circuit acting as a directional valve to cause distortion of the alternating magnetic flux flowing in said circuit.

2. An apparatus such as claimed in claim 1 in which said saturated portion of said core is magnetically energized by means of a permanent magnet.

3. An apparatus such as claimed in claim 1 in which said portion of the core which is magnetically saturated has a restricted cross section as compared to the remainder of the core.

4. In an inductive device, an element of magnetic material having low coercive force forming a magnetic circuit, means for generating an alternating magnetic flux in said circuit, an element of high coercive force material forming a second magnetic circuit including a portion of said first element, means for substantially confining said alternating flux within said first circuit, means for producing a continuous flux in said second circuit, said continuous flux in said portion of the first element causing distortion of the alternating magnetic flux in said circuit.

5. An inductive device of the static type having a magnetic element forming a magnetic circuit, an input coil associated with said element and having an alternating current therein causing an alternating magneto motive force to be generated in said circuit, an output circuit including windings associated with said element, means for causing magnetic saturation of only certain points of said element, said saturated points causing distortion of the flux produced by said force in said magnetic circuit and the consequent production of an alternating current of higher frequency than that of the current in said output circuit flowing in the input coil.

6. An inductive device having a magnetic element providing a magnetic circuit having parallel paths, means including an input coil energized by alternating current for causing an alternating magnetic flux to flow in both paths, each of said paths having a portion of restricted area, a magnet in bridge of each of said portions causing magnetic saturation thereof, an output circuit including windings on the element in each path, said saturated portions of said paths causing the alternating current generated in said output circuit to have a frequency which is a multiple of the alternating current flowing in the input circuit.

7. An inductive device comprising a magnetic element of magnetic material forming a magnetic circuit having parallel paths, means for generating an alternating flux in said paths, a pair of permanent magnets each associated with one of said paths in such a manner as to cause magnetic saturation of only a portion of each path, said saturated portions acting as directional valves to delay the change in flux in said paths alternately.

8. In an inductive device, a magnetic element forming a magnetic circuit of low impedance to alternating magnetic flux, a second magnetic element forming a second magnetic circuit of high impedance to alternating magnetic flux, said circuits having a portion in common, means for causing an alternating magnetic flux to flow in said first circuit and means for causing a fixed magnetic flux to flow in said second circuit, said common portion magnetically saturated by said fixed magnetic flux to distort the alternating magnetic flux in said first circuit.

9. An inductive device such as claimed in 8 having means in the first circuit to substantially exclude said fixed magnetic flux from the main portion of said first circuit, and means associated with the second circuit to substantially exclude the alternating magnetic flux from the main portion of said second circuit.

10. In an inductive device, an element of magnetic material forming a magnetic circuit having two parallel paths and a common leg, a winding associated with the common leg for generating an alternating magnetic flux in said path, means for causing a fixed magnetic flux to flow in a portion of each of said paths only to saturate that portion magnetically, each said portion forming a directional valve in each path at said points to thereby control the alternating flux flowing therein.

11. In an inductive device for converting an alternating current of one frequency into an alternating current of a higher frequency, a magnetic circuit comprising a core of soft iron having a center leg and a pair of outer legs, a coil encircling the center leg, said coil included in a circuit containing alternating current of said one frequency, the alternating current in said coil causing an alternating magnetic flux to flow in said magnetic circuit, a portion of each outer leg of said core having a restricted cross sectional area, a permanent magnet having its poles adjacent said core on opposite sides of one such area to thereby cause magnetic saturation thereof, a second permanent magnet similarly mounted to cause magnetic saturation of the other area, other coils encircling portions of said core, said other cores included in an output circuit, said saturated areas controlling the alternating magnetic flux in said core in such a manner as to cause an alternating current of the higher frequency to flow in said output circuit.

12. A frequency converter comprising a soft iron core having two parallel paths, a winding on said core connected in an alternating current circuit, current in said winding causing alternating magnetic flux to be generated in said paths, a point in each path having a restricted area, means for producing a localized steady magnetic flux in said core at each point, the steady flux at each point causing magnetic saturation thereof and a consequent valve action at each point to alternately distort the alternating flux in said paths, other windings on said core, said distorted flux causing the generation of a current in said other windings of a higher frequency than that in said first winding.

HAROLD J. McCREARY.